United States Patent
Sirdey et al.

(10) Patent No.: US 11,449,753 B2
(45) Date of Patent: Sep. 20, 2022

(54) METHOD FOR COLLABORATIVE LEARNING OF AN ARTIFICIAL NEURAL NETWORK WITHOUT DISCLOSING TRAINING DATA

(71) Applicant: COMMISSARIAT A L'ENERGIE ATOMIQUE ET AUX ENERGIES ALTERNATIVES, Paris (FR)

(72) Inventors: Renaud Sirdey, Cernay-la-Ville (FR); Sergiu Carpov, Massy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 173 days.

(21) Appl. No.: 16/899,056

(22) Filed: Jun. 11, 2020

(65) Prior Publication Data

US 2020/0394518 A1    Dec. 17, 2020

(30) Foreign Application Priority Data

Jun. 12, 2019 (FR) ................................ FR19 06241

(51) Int. Cl.
*G06N 3/08* (2006.01)
*G06K 9/62* (2022.01)
(Continued)

(52) U.S. Cl.
CPC .............. *G06N 3/08* (2013.01); *G06K 9/6228* (2013.01); *H04L 9/008* (2013.01); *H04L 9/085* (2013.01)

(58) Field of Classification Search
CPC .......... G06N 3/08; G06N 3/086; G06N 3/088; G06N 3/063; G06N 3/0454; H04L 9/0008; H04L 9/08; H04L 9/085; G06K 9/6228

(Continued)

(56) References Cited

U.S. PATENT DOCUMENTS

| 8,473,740 B2 * | 6/2013 | Vion-Dury ................ H04L 9/14 713/189 |
| 2012/0201378 A1 * | 8/2012 | Nabeel .................... H04L 9/008 380/255 |

(Continued)

FOREIGN PATENT DOCUMENTS

| CN | 109684855 A | 4/2019 |
| EP | 3060 165 A1 | 6/2018 |

OTHER PUBLICATIONS

French Preliminary Search Report dated Feb. 7, 2020 in French Application 19 06241 filed Jun. 12, 2019 (with English Translation of Categories of Cited Documents), 2 pages.

(Continued)

*Primary Examiner* — Jeffrey C Pwu
*Assistant Examiner* — Samuel Ambaye
(74) *Attorney, Agent, or Firm* — Oblon, McClelland, Maier & Neustadt, L.L.P.

(57) ABSTRACT

A method for federative learning of an artificial neural network model on a plurality of sets of training data. The learning method used a plurality of data suppliers each having a distinct set of training data and a symmetric key, and an aggregation platform aggregating partial models trained on a sub-plurality of these sets, in each iteration. In each iteration, the platform selects a sub-plurality of data suppliers and supplies the parameters of the model to them, in homomorphically encrypted form. Each training data supplier decrypts these parameters, trains the model on his own data set and returns the parameters of the partial model thus obtained, encrypted by his symmetric key, to the platform. The aggregation platform then transcrypts these partial models in the homomorphic domain, and combines them in the homomorphic domain to obtain a global model.

5 Claims, 4 Drawing Sheets

(51) Int. Cl.
*H04L 9/00* (2022.01)
*H04L 9/08* (2006.01)

(58) Field of Classification Search
USPC ....... 706/25; 726/1, 2, 3, 22, 26, 28, 29, 30; 713/161, 171, 182, 189; 380/44, 277, 380/278, 282
See application file for complete search history.

(56) References Cited

U.S. PATENT DOCUMENTS

2016/0105402 A1\* 4/2016 Soon-Shiong ...... H04L 63/0428 713/164
2020/0358599 A1\* 11/2020 Baracaldo Angel ... G06N 20/20

OTHER PUBLICATIONS

McMahan, H. B. et al., "Communication-Efficient Leaning of Deep Networks from Decentralized Data," Proceedings of the 20$^{th}$ International Conference on Artificial Intelligence and Statistics (AISTATS), W&CP, vol. 54, arXiv:1602.05629v3 [cs.LG], Feb. 28, 2017, 11 pages.

Coron, J.-S. et al., "Batch Fully Homomorphic Encryption over the Integers," Advances in cryptology—EUROCRYPT 2013, 32nd annual international conference on the theory and applications of cryptographic techniques, May 26-30, 2013, 27 pages.

Brakerski, Z. et al., "Fully Homomorphic Encryption without Bootstrapping," ACM Transactions on Computation Theory, vol. 18, No. 3, Jan. 2011, 27 pages.

Liu, C. et al., "Secure Model Fusion for Distributed Learning Using Partial Homomorphic Encryption", (Apr. 25, 2019), Robocup 2008: Robot Soccer World Cup XII; [Lecture Notes in Computer Science; Lect. Notes Computer], Springer International Publishing, Cham, XP047507043, 26 pages.

Phong, L. T. et al., "Privacy-Preserving Deep Learning via Additively Homomorphic Encryption", IACR, International Association for Cryptologic Research, vol. 20180104:045638, Aug. 1, 2017 XP061034574, URL:http://eprint.iacr.org/2017/715.pdf, 18 pages.

U.S. Appl. No. 15/756,623, filed Sep. 20, 2018 US 2018-0267981 A1 Renaud Sirdey et al.

U.S. Appl. No. 15/767,885, filed Oct. 18, 2018 US 2018-0300497 A1 Sergiu Carpov et al.

U.S. Appl. No. 16/467,851, filed Oct. 31, 2019 US 2019-0334708 A1 Sergiu Carpov et al.

\* cited by examiner

METHOD FOR COLLABORATIVE LEARNING OF AN ARTIFICIAL NEURAL NETWORK WITHOUT DISCLOSING TRAINING DATA

TECHNICAL FIELD

This invention relates to the general field of artificial intelligence and more particularly to the field of collaborative learning of an artificial neural network. It also relates to the privacy-preserving computation field.

STATE OF PRIOR ART

An artificial neural network is generally learned by training a model on the data from a data supplier. The computer platform responsible for the training is sometimes coincident with the data supplier himself. However most frequently, the platform accesses the data of an external supplier making use of a client/server architecture, the server managing the training database and the client being responsible for training the model.

More recently, a method for collaborative learning has been proposed that can train an artificial neural network on data stored in a distributed manner, for example using data stored in users' mobile terminals. In such a collaborative context, several distinct data suppliers each have a distinct set of training data and agree to collaborate through an aggregation platform, so as to obtain a model trained on the union of these data sets.

A description of a method for collaborative learning called federated learning can be found in the paper by H. B. McMahan et al. entitled "Communication-efficient learning of deep networks from decentralized data", published in Proc. of the 20th International Conference on Artificial Intelligence and Statistics (AISTATS), vol. 54, 2017.

Said federative learning method makes use of a plurality of data suppliers and an aggregation platform. Its operation can be summarised as follows:

The aggregation platform starts from an initial model common to all data suppliers. This model is updated iteratively, and the model of the current iteration is called the current model. The current model is defined by its parameters, namely the synaptic weights of the synapses between neurons in adjacent layers in the network.

In each iteration, the selected aggregation platform selects all or some of the data suppliers and transmits the parameters of the current model to them.

Each data supplier thus selected then performs a predetermined number of learning iterations starting from the current model, on his own data set. The result of learning is a locally updated model.

The parameters updated locally by each supplier are then forwarded to the aggregation platform that combines them to produce an update to the current model.

The parameters of the current model are then transmitted to data suppliers for the next iteration The process is repeated until a stop criterion is satisfied. The final version of the model, in other words the parameters of the model after training, is sent by the aggregation platform to the different data suppliers.

It will thus be understood that each data supplier contributes to producing a global model by training him on his own data set. It is important to note that the data from the different suppliers are not sent to the platform, only the updated parameters are sent.

Federative learning has interesting properties. Firstly, it guarantees a certain level of confidentiality between data suppliers since they cannot access learning data sets of each other. The volume of data exchanged between the aggregation platform and the different suppliers is then relatively small considering the size of the training data sets (it is more economic to transmit the parameters of the model rather than the training data itself). Finally, most of the calculations, specifically the part induced by execution of the learning algorithm, is transferred to the data suppliers, and the platform merely combines partial models.

However, this federative learning model also has disadvantages. Thus, the current model and in particular the final version of the model, at the end of the learning process, is known both by the platform and by the different data suppliers. However, in some cases, it is desirable to guarantee that the parameters of the model remain confidential with regard to the platform itself. Furthermore, knowledge of the parameters of the partial locally trained models enables the platform to obtain the training data, making use of model inversion techniques.

Thus for example, if several cybersecurity companies each having a data base of computer attack signatures decide to collaborate to create a more efficient neural network classification model, they will not necessarily want to share information about attacks that took place on the networks of their client companies, and even more so may not want to disclose the final model to an aggregation platform, since it could disclose their detection capability.

Consequently, one purpose of this invention is to propose a method for federative learning of an artificial neural network that does not have the disadvantages mentioned above.

PRESENTATION OF THE INVENTION

This invention is defined by a method for federative learning of an artificial neural network as mentioned in the main claim. Particular embodiments are specified in the dependent claims.

BRIEF DESCRIPTION OF THE DRAWINGS

Other characteristics and advantages of the invention will become clear after reading a preferred embodiment of the invention, described with reference to the appended figures among which.

DETAILED PRESENTATION OF PARTICULAR EMBODIMENTS

Figure 1:
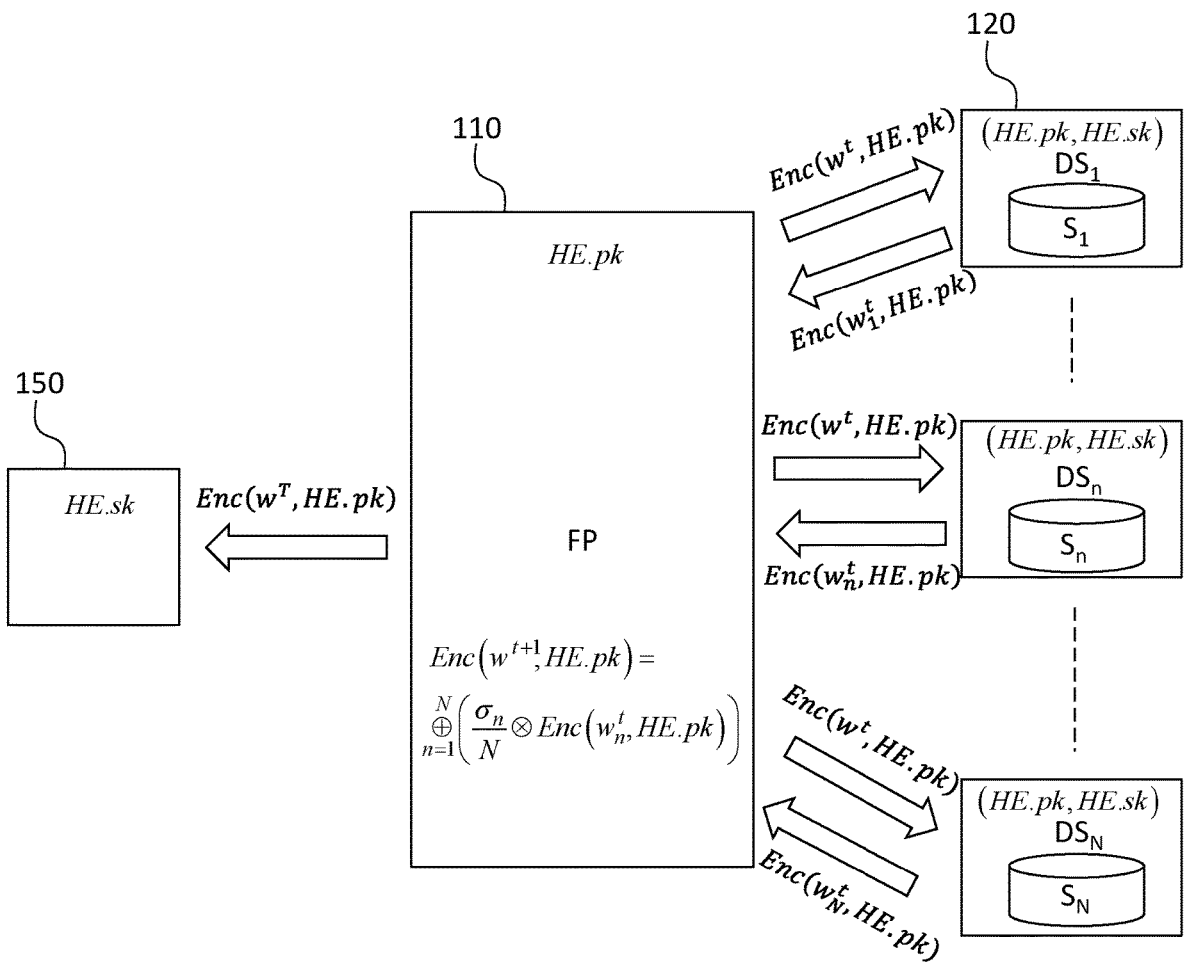
FIG. 1 diagrammatically represents exchanges between an aggregation platform and learning data suppliers in a method for federative learning of an artificial neural network learning of an artificial neural network useful for understanding the present invention.

In the following we will consider a plurality of data suppliers each having a set of learning data, these data suppliers wishing to federate these data sets to train an artificial neural network while preserving the confidentiality of these data relative to the others. The global training of the neural network is controlled by a data processing platform distinct from the different data suppliers, called the aggregation platform in the remainder of this presentation.

Training of the neural network may be of the supervised or non-supervised type. In the first case, it will be understood that the training data include labelled examples, in other words predictive values of variables (or network input data) for which the corresponding values of target variables are known. In the second case, the neural network presupposes no labelling of training data, which consists simply of clustering examples by category.

The artificial neural network is trained by the data processing platform to perform a predetermined task. This task can be a classification, a prediction, or a simple reduction of the dimension of the input data space (neural network acting as self-encoder). The reduction of dimension itself can also be done prior to another task, for example a classification by a second neural network in cascade with the previous network.

The aggregation platform starts from an initial model of the neural network. This model is defined by its parameters, in other words more precisely by the synaptic coefficients between neurons in adjacent layers, and its activation function.

The initial model is shared between all parties, in other words it is common to data suppliers and to the aggregation platform. For example, it may be the result of an initial convention, such as a coarse model disclosed above, or a random draw of the different parameters involved. In the latter case, the parameters of the initial model are communicated to the different suppliers by the aggregation platform.

This initial model is then iteratively updated involving the different data suppliers and the aggregation platform. The model updated during an iteration is called the current model.

The following operations are performed during each iteration:

Firstly, the aggregation platform selects all or some of the data suppliers for partial updates. In particular, this selection could be the result of a random draw of a predetermined number of data suppliers in each iteration. This option may be preferred when the number of data suppliers is particularly high and/or their computation resources are limited, for example if they are mobile terminals or nodes of an IoT system. On the other hand, when the data suppliers are servers, it may be preferred that they should all contribute.

The aggregation platform then transmits the parameters of the current model, encrypted by means of a homomorphic encryption, to the data suppliers thus selected. For example, the parameters of the current model can be encrypted using the public key, HE.pk, of a homomorphic cryptosystem (HE.pk,HE.sk). It will be assumed that all data suppliers are in possession of the corresponding private key, HE.sk. It will be understood that the term private key as used herein means that the key belongs to the group of data suppliers. For example, this private key could have been shared between the data suppliers by means of a Diffie-Hellman multipartite key exchange protocol.

Each selected data supplier decrypts the parameters of the current model by means of the shared private key, HE.sk. He can thus build up the current model in plaintext. He then trains the neural network thus obtained on his own training data set by performing a (small) predetermined number of local iterations. In each local iteration, the parameters of the model are updated by means of a training algorithm such as the stochastic gradient descent algorithm, known as such. At the end of this learning phase, each data supplier has a partially updated model, hereinafter called the partial model, in the sense that it was only trained on its own corpus of training data.

Each data supplier that has performed this update then homomorphically updates the parameters of the partial model that he obtained, making use of the public key HE.pk and transmits them to the aggregation platform.

According to one variant, each data supplier encrypts the parameters of his partial model using a secret key, for example a symmetric key of a stream encryption, instead of encrypting them homomorphically. The data suppliers then send the parameters encrypted using their own secret keys to the platform. In this case the data suppliers will each have transmitted their own homomorphically encrypted secret keys to the aggregation platform. Also, advantageously, a single secret key can be chosen for all data suppliers, and can have been shared making use of a Diffie-Hellman multipartite key exchange protocol. The platform can then transcript the encrypted parameters using symmetric encryption to obtain these same homomorphically encrypted parameters. This variant has the advantage that it uses less passband (on the uplink) than the previous variant to the extent that a symmetric encryption results in the same volume of encrypted data as plaintext data.

Regardless of the variant used for encryption of the parameters, the aggregation platform uses a combination operator evaluated in the homomorphic domain, to make a combination of the different partial models to obtain an aggregated model equivalent to the model that would have been trained on the reunion of the data sets of the selected suppliers. Different combination operators can be envisaged, as described below.

As a result of the combination in the homomorphic domain, the parameters of the aggregated model are obtained by the platform in encrypted form. Thus, the aggregation platform has access to neither the partial models nor to the aggregated model resulting from the combination operation.

The aggregation platform can then start the next iteration by making a new selection of data suppliers and transmitting the parameters of the aggregated model to them, that forms the current model of the new iteration.

The updating process continues until a stop criterion is satisfied, for example after a predetermined number of iterations or after a predetermined number of local iterations.

At the end of the process, the aggregation platform can send the parameters of the final model, encrypted in the homomorphic domain, to all data suppliers. These data suppliers then make use of the shared private key HE.sk to obtain the final plaintext model.

Alternatively, the platform can abstain from making this transmission, particularly if the platform selects all data suppliers during each iteration, each data supplier then having the aggregated model received in the last iteration and being able to decrypt it to obtain a final plaintext model.

In all cases, the data suppliers have a neural network at the end of the learning process, having been trained on the union of the data sets, without disclosing these data between suppliers nor to the aggregation platform. Furthermore, the platform accesses neither the intermediate models nor the final model; only the data suppliers and more generally the recipients of the final model having the private key HE.sk, can access them.

It will be noted that in the federative learning process described above, the training data are never encrypted and/or transmitted homomorphically to the platform, only the parameters of the current model are. The parameters represent a much smaller quantity of data then the training data, a fortiori after encryption in the homomorphic domain. Thus, the learning process does not require very high transmission rates.

Finally, it will be noted that the time-consuming computation part, namely updating the partial models, is done in the plaintext domain by the data suppliers. Therefore, these calculations are relatively simple and are made in parallel, which leads to short iteration cycles. The only operation that is carried out in the homomorphic domain is the combination operation, that is the simplest operation. Furthermore, this operation can also be done in parallel as will be discussed later.

FIG. 1 diagrammatically represents exchanges between the aggregation platform and learning data suppliers in a method of federative learning useful to a good understanding of the invention.

The aggregation platform FP, is shown as 110 and the N data suppliers, $DS_1, \ldots, DS_N$, are shown as 120. The aggregation platform is typically hosted on a calculation server in the Cloud. Data suppliers can also be servers, user terminals, or even smartphones or individual computers, or even to a lesser extent the nodes of an IoT system.

Each of the data suppliers, 120, has sets of learning data, $S_1, \ldots, S_N$ and at the end of federative learning has plaintext parameters of the artificial neural network, trained on the set $$S = \bigcup_{n=1}^{N} S_n.$$

Optionally, an additional recipient of the trained model, 150, distinct from the data suppliers, will also be able to receive the plaintext parameters of the artificial neural network, although he has not participated in the federative learning. This recipient can also have ordered this learning.

The data suppliers, 120, and possibly the additional recipient, 150, share a common private key HE.sk of a homomorphic cryptosystem (HE.pk,HE.sk). The manner in which the private key is shared between these entities does not form part of this invention. However, as indicated above, a Diffie-Hellman multipartite key exchange protocol can be used to share this key confidentially from third parties. Obviously, the data suppliers and possibly the additional recipient, have the corresponding public key. Finally, the aggregation platform has the public key HE.pk but not the private key HE.sk.

Exchanges between the different entities during an iteration are also shown on the figure.

If we use w' to synthetically denote the parameters of the model, in other words the synaptic coefficients of the artificial neural network at the end of iteration t, the aggregation platform has these parameters encrypted in the homomorphic domain, namely Enc($w^t$,HE.pk).

The platform FP selects a set $\Omega^t$ of M data suppliers among N, in which M≤N, and transmits the encrypted parameters Enc($w^t$, HE.pk) to each of them.

Each data supplier $DS_n$ of $\Omega^t$ decrypts the encrypted parameters concerned using the private key, HE.pk, trains the model on its own learning data set $S_n$ over a few iterations, and deduces the parameters of the partial model $w_n^t$, for example using the stochastic gradient algorithm known in itself. Each data supplier $DS_n$ of $\Omega^t$ then returns the parameters of his partial model to the platform FP, after having homomorphically encrypting them, namely Enc($w_n^t$,HE.pk).

The aggregation platform FP then combines the partial models thus trained by the suppliers of $\Omega^t$, in the homomorphic domain.

According to one variant, the combination may apply to all partial models, including those of unselected suppliers, in other words belonging to $\Omega - \Omega^t$. In other words, for unselected data suppliers, Enc($w_n^t$, HE.pk)=Enc($w_n^{t-1}$, HE.pk).

In any case, aggregation of partial models can for example be done using a simple average:

$$Enc(w^{t+1}, HE.pk) = \bigoplus_{n=1}^{N} \left( \frac{\sigma_n}{N} \otimes Enc(w_n^t, HE.pk) \right) \quad (1)$$

In which $\oplus$ and $\otimes$ are external addition and multiplication operations respectively in the homomorphic domain, and in which $\sigma_n = Card(S_n)$, and in which it is assumed herein for reasons of simplification of the presentation that the N data suppliers were selected.

It is recalled that an additive homomorphic encryption satisfies the following properties:

$$Enc(a+b,HE.pk) = Enc(a,HE.pk) \oplus Enc(b,HE.pk) \quad (2\text{-}1)$$

$$Enc(k.a,HE.pk) = k \otimes Enc(a,HE.pk) \quad (2\text{-}2)$$

The $\otimes$ operator is used to multiply an encrypted number by a plaintext number, the result being encrypted. In this case, it is used to perform multiplications by the terms $$\frac{\sigma_n}{N}.$$

To avoid making operations in floating-point computation (not possible in the homomorphic domain), in practice the terms $$\frac{\sigma_n}{N}$$

will be multiplied by a constant with a high value before the multiplication.

Weighting by $\sigma_n$ within the expression (1) confers greater importance to data suppliers in possession of large sets of learning data. This weighting assumes that the sizes $\sigma_n$ of the different sets of learning data are known to the platform. For example, they can have been sent to it by the data suppliers in the initialisation phase.

Expression (1) and expressions (2-1) and (2-2) can be deduced:

$$Enc(w^{t+1}, HE.pk) = Enc\left( \sum_{n=1}^{N} \frac{\sigma_n}{N} \cdot w_n^t, HE.pk \right) \quad (3)$$

It should be noted that combination operations more complex than those in (1) could be envisaged without going outside the scope of the present invention. In this case, we could use FHE (Full Homomorphic Encryption) or SHE (Somewhat Homomorphic Encryption) cryptosystems.

Once the combination has been made, the aggregation platform has parameters encrypted in the homomorphic domain, namely Enc($w^{t+1}$,HE.pk) and can make a new data supplier selection, $\Omega^{t+1}$.

At the end of the learning operations, the platform FP can transmit the encrypted parameters Enc($w^T$,HE.pk), wherein T is the total number of iterations, to all data suppliers and to the additional recipient 150. These can recover the plaintext parameters of the model using the private key, HE.sk.

Figure 2:
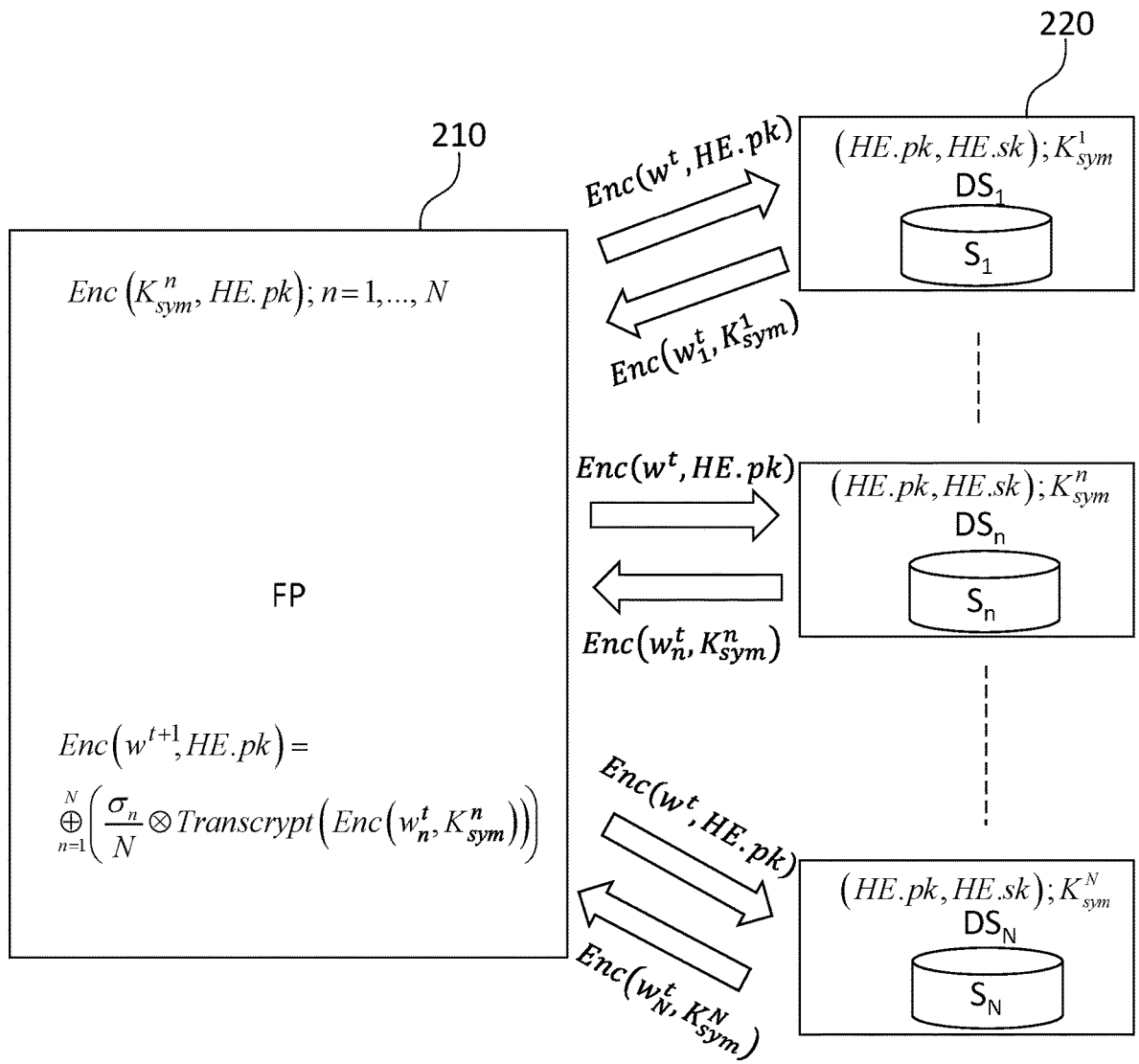
FIG. 2 diagrammatically represents exchanges between an aggregation platform and learning data suppliers in a method for federative learning of an artificial neural network, according to one embodiment of the present invention.

FIG. 2 diagrammatically represents exchanges between an aggregation platform and learning data suppliers in a method of federative learning of an artificial neural network, according to one embodiment of this invention.

The aggregation platform FP, is shown as 210 and the N data suppliers $DS_1, \ldots, DS_N$ are shown as 220.

Exchanges are different from those described with reference to FIG. 1 in the sense that the parameters transmitted by each data supplier, $DS_n$, are not encrypted in the homomorphic domain but by a stream encryption, making use of a secret key, $K_{sym}^n$, namely Enc($w_n^t,K_{sym}^n$). The parameters thus encrypted are transcrypted by the aggregation platform using the secret key encrypted in the homomorphic domain, Enc($K_{sym}^n$,HE.pk) to supply the same parameters homomorphically encrypted. For example, the platform makes a second encryption in the homomorphic domain of parameters encrypted using the secret key, and then decrypts the doubly encrypted parameters in the homomorphic domain making use of the key Enc($K_{sym}^n$,HE.pk). The result of the transcryption is simply Enc($w_n^t$,HE.pk). A detailed description of this transcryption step can be found in application FR-A-3060165 filed in the name of the present Applicant.

The combination of partial models in the homomorphic domain is identical to that done by the platform in the first embodiment. The result, Enc($w^{t+1}$,HE.pk), is then transmitted to the selected data suppliers.

The encrypted keys Enc($K_{sym}^n$,HE.pk), n=1, ..., N, are stored on the aggregation platform. Advantageously, since the volume of these encrypted keys is relatively large, a single secret key will be chosen for all data suppliers, in other words $K_{sym}^n = K_{sym}$, n=1, ..., N, so that there will be only one single encrypted key, Enc($K_{sym}$,HE.pk), to be stored on the platform.

Figure 3:
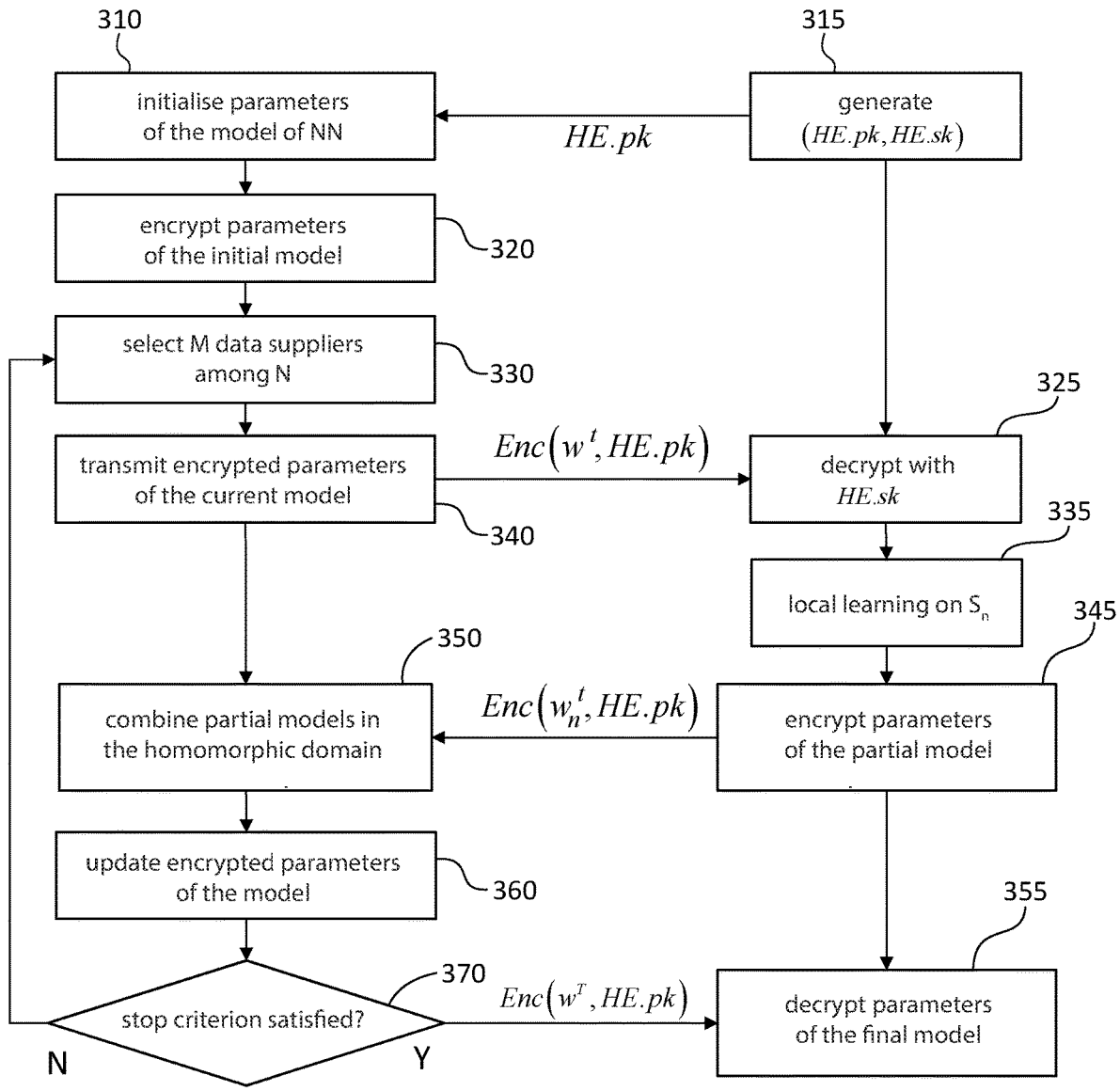
FIG. 3 represent a flow chart of the method for federative learning of an artificial neural network illustrated in FIG. 1.

FIG. 3 represent a flow chart of a method of federative learning of an artificial neural network illustrated in FIG. 1

The left part of the figure corresponds to the sequence of steps performed by the aggregation platform while the right part corresponds to the sequence of steps performed by data suppliers.

Steps 310 and 315 correspond to initialisation of the platform and data suppliers respectively.

In 310, the parameters of the model of the artificial neural network are initialised by random draw or from a coarse model. The initial parameters of the model are denoted $w^0$. In 315, the data suppliers construct or exchange a common private key, HE.sk of an asymmetric homomorphic cryptosystem (HE.pk,HE.sk). The corresponding public key, HE.pk., is transmitted to the aggregation platform.

In 320, the platform homomorphically encrypts the parameters of the model using the public key HE.pk, namely Enc($w^0$,HE.pk).

An iterative loop is then started, the current iteration being denoted by index t and the parameters of the current model being synthetically denoted $w^t$.

In 330, the aggregation platform randomly or non-randomly selects a group $\Omega^t$ of M data suppliers among N.

In 340, the platform transmits the parameters of the current model, encrypted in the homomorphic domain, namely Enc($w^t$,HE.pk).

In 325, each data supplier in the group $\Omega^t$ decrypts said parameters using the key HE.sk so as to obtain the plaintext parameters.

In 335, each data supplier, $DS_n$, in the group $\Omega^t$ updates the parameters of the model by training him on his own set of learning data, $S_n$. For example, this update can be made using the SGD (Stochastic Gradient Descent) algorithm. To achieve this, the learning set $S_n$ can be divided into mini-batches and the parameters of the model are updated successively on the different mini-batches by:

$$w_n^t \leftarrow w_n^t - \eta \nabla Q_b(w_n^t) \qquad (4)$$

wherein $Q_b$ is the objective function on the batch and $\eta$ is the learning rate.

At the end of this update phase, in step 345, the data supplier $DS_n$ has the parameters of a partial model. He homomorphically encrypts the parameters of the partial model, namely Enc($w_n^t$,HE.pk) and transmits them to the aggregation platform.

In 350, the platform combines the parameters of the partial models of the different data suppliers in the homomorphic domain. As mentioned above, this combination can apply only to the partial models of data suppliers selected in step 330 or to the partial models of all data suppliers. Different combination operators can be envisaged such as a simple average, as indicated in expression (1).

The result of this combination gives the parameters of the model encrypted in the homomorphic domain for the new iteration, namely Enc($w^{t+1}$,HE.pk), in 360.

The next step in 370 is to test if a stop criterion is satisfied, for example if a predetermined number of iterations T is reached. If not, the procedure returns to the selection step 330. On the other hand if so, the aggregation platform diffuses the parameters of the model obtained after the last iteration namely Enc($w^T$,HE.pk), to all data suppliers (and possibly to additional recipients as described with reference to FIG. 1). In 355, the latter decrypt the parameters of the model using the common private key HE.sk, to obtain the plaintext parameters of the model, $w^T$.

The data suppliers and, if applicable, the additional recipient(s) then are provided with an artificial neural network, having been trained federatively on the reunion of learning sets of data suppliers.

Figure 4:
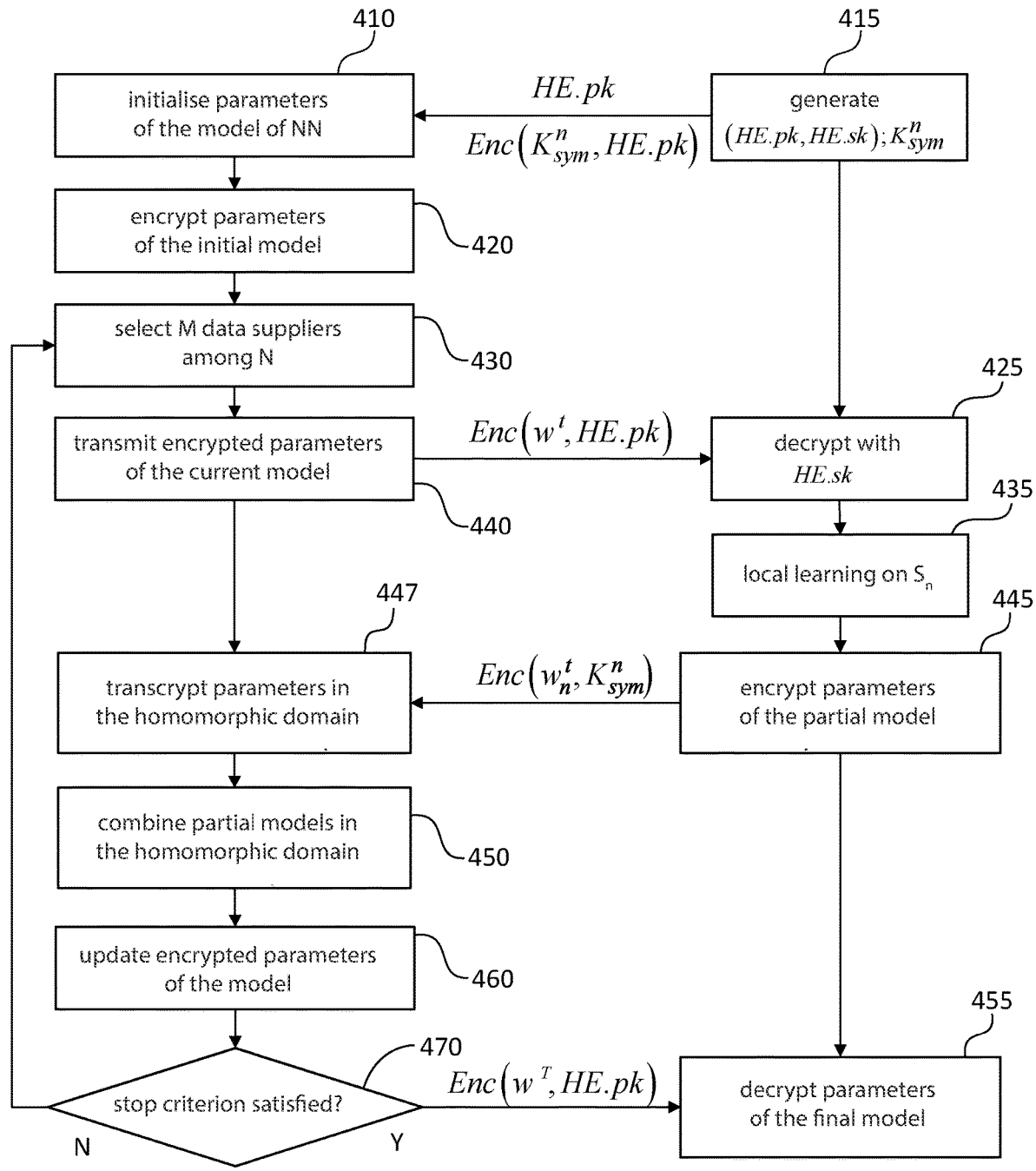
FIG. 4 represents a flowchart of a method for federative learning of an artificial neural network according to one embodiment of the invention.

FIG. 4 represents a flowchart of a method for federative learning of an artificial neural network according to one embodiment of the invention.

Steps 410-470 are identical or similar to steps 310-370 respectively in FIG. 3. Only the differences are described below.

In step 415, a homomorphic cryptosystem common to all data suppliers, a secret key and advantageously a symmetric key $K_{sym}^n$ of a stream encryption, are also generated. It is recalled that according to one variant, this secret key is common to the data suppliers or to only some of them. The secret key $K_{sym}^n$, encrypted homomorphically, namely Enc.($K_{sym}^n$,HE.pk) is transmitted to the aggregation platform with the homomorphic public key, HE.pk.

In step 445, the data supplier $DS_n$ has the parameters of a partial model. Instead of encrypting the parameters of the partial model homomorphically as in the first embodiment, the data supplier encrypts then using the symmetric encryption Enc($w_n^t,K_{sym}^n$) and transmits them to the platform.

In step 447, the platform transcrypts the parameters of the partial models of the selected data suppliers. In other words, these encrypted parameters are encrypted a second time homomorphically and decrypted in the homomorphic domain using the encrypted key, $\text{Enc}(K_{sym}^n, HE.pk)$. More simply, the purpose of this transcryption operation is to change the parameters from a state in which they are encrypted by a symmetric encryption to a state in which they are homomorphically encrypted, without the use of an intermediate state in which they would be exposed in plaintext. Once homomorphically transcrypted, the partial models are combined in 450 in the same way as in step 350.

The parameters of partial models not selected during the current iteration can be obtained in encrypted form in the homomorphic domain, either they had already been transcrypted in a previous iteration, or they were encrypted homomorphically using the public key HE.pk, in step 440, during the first iteration.

At the end of the federative learning process, the platform transmits the parameters of the model in homomorphically encrypted form, to the different data suppliers and, if applicable, to the additional recipient(s) with the private key, HE.sk.

Whatever the embodiment, the aggregation platform can use an SHE or FHE encryption that can perform batching operations. For example, a description of such an encryption method is given in the paper by J-S. Coron et al. entitled "Batch fully homomorphic encryption of the integers" published in Advances in Cryptology—EUROCRYPT 2013, Lecture Notes in Computer Science, vol 7881. Springer, Berlin, Heidelberg.

The principle of batch processing is to multiplex several plaintext values to form a plaintext composite value to obtain a single encrypted value. Thus, instead of encrypting plaintext values independently of each other, a plaintext composite constructed from the plaintext values concerned is encrypted.

Batch processing makes it possible to parallelise a single operation on a plurality of encrypted values in the homomorphic domain. More precisely, if we use $\alpha_1, \ldots, \alpha_L$ to denote a plurality of first plaintext values and $(\alpha_1, \ldots, \alpha_L)$ a first plaintext composite constructed by batching these first plaintext values, and if $\beta_1, \ldots, \beta_L$ is used to denote a same plurality of second plaintext values and if $(\beta_1, \ldots, \beta_L)$ denotes a second plaintext composite constructed by batching these second plaintext values, and if the first and second plaintext composites in question are encrypted:

$$\text{Enc}(\alpha_1, \ldots, \alpha_L; HE.pk) = \overline{\alpha} \quad (5\text{-}1)$$

$$\text{Enc}(\beta_1, \ldots, \beta_L; HE.pk) = \overline{\beta} \quad (5\text{-}2)$$

an addition or multiplication operation can then be made in parallel on values encrypted in the homomorphic domain by using $\overline{\alpha}$ and $\overline{\beta}$ to compute encrypted values $c_{\overline{\alpha} \oplus \overline{\beta}}$ and $c_{\overline{\alpha} \odot \overline{\beta}}$ such that:

$$\text{Dec}(c_{\overline{\alpha} \oplus \overline{\beta}}, HE.sk) = (\alpha_1 + \beta_1, \ldots, \alpha_L + \beta_L) \quad (6\text{-}1)$$

$$\text{Dec}(c_{\overline{\alpha} \odot \overline{\beta}}, HE.sk) = (\alpha_1 \times \beta_1, \ldots, \alpha_L \times \beta_L) \quad (6\text{-}2)$$

Similarly, encrypted values can be multiplied by plaintext constants $(k_1, \ldots, k_L)$ in parallel, starting from an encrypted composite $\overline{\alpha}$, to compute an encrypted value $c_{k\overline{\alpha}}$, such that:

$$\text{Dec}(c_{k\overline{\alpha}}, HE.sk) = (k_1 \alpha_1, \ldots, k_L \alpha_L) \quad (7)$$

The above-mentioned batch processing properties make it possible to calculate in a small number of operations, particularly when the combination of partial models is made by averaging (see expression (1)).

Indeed, it should be remembered that $w_n^t$ synthetically represents the different parameters of a partial model, in other words $w_n^t$ is a vector for which the components $w_n^t(1), \ldots, w_n^t(L)$ are the L synaptic coefficients of the artificial neural network trained on set $S_n$, in iteration t.

The data supplier $DS_n$ can encrypt a plaintext composite for which the constituents are components of $w_n^t$ to obtain the encrypted composite:

$$\overline{w}_n^t = \text{Enc}(w_n^t(1), \ldots, w_n^t(L), HE.pk) \quad (8)$$

The platform can then use properties (6-1) and (7) to calculate $$w^{t+1} = \bigoplus_{n=1}^{N} \left( \frac{\sigma_n}{N} \otimes \overline{w}_n^t \right) \quad (9)$$

wherein the expression between parentheses is obtained by performing a single operation homomorphically on the composite instead of L operations in parallel on the parameters of the model.

Parallelisation of the calculations on the different parameters is particularly relevant for large models (high value of L), the complexity of the calculations then being proportional to the number N of users (data suppliers) and independent of the size of the model. However, it is clear that for practical reasons, there could be a need to use several composites in parallel to handle very large models (due to the limited number of slots in a batch).

On the contrary, when the number N of users (data suppliers) is very large compared with the size of the model, it will be preferred to use batching on the different users. In other words, L composites are then created, the N constituents of each composite being parameters with the same index of the different partial models. More precisely, the composite associated with the parameter $\ell$ is given by $w_1^t(\ell), \ldots, w_N^t(\ell)$. The corresponding encrypted value is denoted $\overline{w}^t(\ell)$.

The combination of partial models by averaging (expression (1)) can then be simplified as described below.

Some homomorphic encryption methods such as BGV make it possible to make an accumulation of constituent plaintext values of the plaintext composite, as described in the innovative paper by Z. Brakerski et al. entitled "Fully homomorphic encryption without bootstrapping published in Cryptology ePrint Archive, Report 2011/277. More precisely, a second encrypted $\tilde{\alpha}$ can be obtained from the encrypted value $\overline{\alpha}$ for which decryption gives:

$$\text{Dec}(\tilde{\alpha}; HE.sk) = \left( \sum_{n=1}^{N} \alpha_n, \ldots, \sum_{n=1}^{N} \alpha_n \right) \quad (10)$$

In other words, after decryption, a second composite is obtained for which all the constituents are equal to the sum of plaintext values constituting the initial composite.

The expression (1) can be calculated by means of L averaging operations on the N data suppliers, each averaging operation applying to a single parameter of the model.

Starting from the property (7), for each $\ell = 1, \ldots, L$, it is first determined from $\overline{w}^t(\ell)$ an encrypted value, $\overline{w}_n^t(\ell)$, which provides, after decryption with HE.sk, $$\left(\frac{\sigma_n}{N}w_1^t(\ell),\ldots,\frac{\sigma_n}{N}w_N^t(\ell)\right).$$

A second encrypted value $\tilde{w}^{t+1}(\ell)$ is calculated by using the property (10). The result of the calculation according to the expression (1) is then represented by homomorphically encrypted values, $\tilde{w}^{t+1}(\ell)$, $\ell=1,\ldots,L$. These encrypted values are transmitted to the selected data suppliers (and in the last iteration to all data suppliers and to the additional recipient(s)). Decryption of each encrypted value $\tilde{w}^{t+1}(\ell)$ with HE.sk provides N identical averages, of which obviously only one is extracted by the data supplier.

The invention claimed is:

1. A method for federative learning of a model of an artificial neural network, the model being characterised by parameters giving synaptic coefficients of said network, the method making use of a plurality of N data suppliers ($DS_1,\ldots,DS_N$) each having a distinct set of learning data ($S_1,\ldots,S_N$) and an aggregation platform (FP), said method beginning with an initialisation step to initialise the parameters of the model, and proceeding with a plurality of successive iterations, each iteration updating the parameters of a current model of the neural network, wherein:

in the initialisation step, the data suppliers share a private key and share a public key of a homomorphic cryptosystem (HE.sk,HE.pk), each data supplier also generating a secret stream encryption key, $K_{sym}^n$, and transmitting the public key of the homomorphic cryptosystem encrypted using said secret key, Enc ($K_{sym}^n$,HE.pk) to the aggregation platform;

and wherein each iteration t, the aggregation platform selects a sub-plurality M<N of data suppliers and transmits the parameters of the current model, homomorphically encrypted, Enc ($w^t$, HE.pk), to the M data suppliers;

each selected data supplier decrypts the parameters thus encrypted using the private key of the homomorphic cryptosystem, trains the current model on its learning data set to obtain a partial model;

each selected data supplier, $DS_n$, encrypts the parameters of the partial model using his secret key, $K_{sym}^n$, and transmits the parameters of the partial model thus encrypted, Enc ($w_n^t$, $K_{sym}^n$), to the aggregation platform;

the aggregation platform transcrypts parameters of the partial models to the different selected data suppliers, to obtain these same parameters encrypted in the homomorphic domain, the aggregation platform combines, in the homomorphic domain, parameters of the partial models obtained by the different data suppliers, to obtain the parameters of a new current model encrypted in the homomorphic domain;

and, when a stop criterion is satisfied, each data supplier decrypts the parameters of the last current model using the private key of the homomorphic cryptosystem, to obtain a final model, trained on the reunion of said learning data sets.

2. The method of federative learning of a model of an artificial neural network according to claim 1, wherein the aggregation platform averages the parameters of each of the partial models thus transcrypted, in the homomorphic domain.

3. The method of federative learning of a model of an artificial neural network according to claim 1, wherein the secret keys of the different data suppliers are identical, the common secret key having been shared between the different data suppliers using a multipartite key exchange protocol.

4. The method of federative learning of a model of an artificial neural network according to claim 3, wherein the platform averages the different parameters of the partial models by batch processing on a homomorphic encrypted value representing a composite of the different parameters of the partial models.

5. The method of federative learning of a model of an artificial neural network according to claim 3, wherein the platform averages the parameters of the same rank of the partial models, by batch processing on a homomorphic encrypted value representing a composite of the parameters of said rank of partial models, using batch processing on a homomorphic encrypted value representing a composite of the parameters of said rank of partial models from the different data suppliers.

* * * * *